United States Patent [19]
Kunz et al.

[11] 3,737,772
[45] June 5, 1973

[54] METER MOVEMENT AND LIMIT STOP

[75] Inventors: Miles C. Kunz; Robert L. Esvang, Chicago, Ill.

[73] Assignee: Sun Electric Corporation, Chicago, Ill.

[22] Filed: June 16, 1971

[21] Appl. No.: 153,896

Related U.S. Application Data

[63] Continuation of Ser. No. 816,129, April 14, 1969, abandoned, which is a continuation of Ser. No. 416,348, Dec. 7, 1964, abandoned.

[52] U.S. Cl. ..........................324/154, 116/136.5
[51] Int. Cl. ..........................G01r 1/08, G01r 5/16
[58] Field of Search ................324/146, 151, 110, 324/144, 154, 155, 106; 116/136.5, 129; 335/222; 73/431–432; 16/82

[56] References Cited

UNITED STATES PATENTS

| | | |
|---|---|---|
| 351,388 | 10/1886 | Mather.....................324/133 |
| 579,344 | 3/1897 | Houston et al. ...............324/151 |
| 1,235,366 | 7/1917 | Noyes.........................324/155 |
| 1,543,912 | 6/1925 | Gammeter......................16/82 |
| 1,588,477 | 6/1926 | Kingston ......................16/82 |
| 1,710,872 | 4/1929 | Groves........................116/129 |
| 1,757,261 | 5/1930 | Simmons.......................16/82 |
| 2,607,812 | 8/1952 | Lederer......................324/151 |

FOREIGN PATENTS OR APPLICATIONS

| | | |
|---|---|---|
| 24,169 | 12/1915 | Great Britain...............324/156 |

*Primary Examiner*—Gerard R. Strecker
*Attorney*—Molinare, Allegretti, Newitt & Witcoff

[57] ABSTRACT

A meter movement having a movable pointer with means for moving the pointer and including a restraining element comprising one or more flexible members or a pivot link and substantially rigid rod which is attached to the pointer and which limits the pointer movement independently of the means for moving the pointer.

18 Claims, 4 Drawing Figures

Patented June 5, 1973  3,737,772

INVENTORS
MILES C. KUNZ
ROBERT L. ESVANG
BY
Bair Freeman & Molinare
Attys.

METER MOVEMENT AND LIMIT STOP

This application is a continuation of Ser. No. 816,129, filed Apr. 14, 1969, now abandoned, which is a continuation of Ser. No. 416,348, filed Dec. 7, 1964, now abandoned.

BACKGROUND OF THE INVENTION

This invention relates to a meter movement and more particularly to means for controlling the limits of deflection of a moving coil type meter.

In meter movements it is necessary to provide stop means to limit the extent of movement of the moving coil and the pointer. Heretofore, such stop means has normally taken the form of physical stop pins or abutments which are engaged by parts on the pointer or moving coil and which positively prevent the pointer and coil from moving beyond the desired limits.

In meters reading in one direction only, the pointer may rest against a zero stop and may engage an end stop at the upper end of the scale. In center zero or null meters the pointer normally rests on the center scale position and engages stops at either end of the scale which limit the extent of its movement.

SUMMARY OF THE INVENTION

It has been found that regardless of the materials from which the stops and the parts on the pointer engaging the stops are formed these parts tend to become contaminated or dirty and to stick, thereby interfering with proper functioning of the instrument. This tendency is naturally more pronounced in meters in which the pointer rests against a stop below zero and may cause failure of the meter to respond with gradually increasing current value because of sticking of the pointer against the stop. To insure proper functioning of meters in navigational instruments and the like it has therefore been necessary to disassemble them at frequent intervals to clean the stops and this operation has added substantially to maintenance costs. In meters such as those used on aircraft for various flight and functional indications proper maintenance of the meters has become a serious maintenance problem requiring more overhauling than the engines.

It is accordingly one of the objects of the present invention to provide a meter movement in which the movement of the pointer is limited without the use of stops that make physical contact with each other.

Another object is to provide a meter movement in which movement of the pointer is limited by a restraining element secured at one end to the pointer and at its other end to a fixed part, such as a bridge, on which the pointer and meter coil are pivotally mounted.

According to a feature of the invention the restraining element is a flexible elongated member which is self-supporting in a plane perpendicular to the pivotal axis of the coil and pointer so that it will not interfere with movement of these parts. The strip may be of round or flattened section, but is preferably a thin flexible metal strip having a greater width than thickness, and is biased into a curve in a plane perpendicular to the axis of the coil and pointer so that it can straighten out easily without interfering with movement of the coil and pointer but will tend to maintain itself in a plane perpendicular to said axis to avoid possible tangling with other parts and interference with its movement.

According to another feature of the invention, the ends of the restraining element are adjustably secured to the pointer and bridge so that the effective length of the strip can easily be adjusted to adjust the limits of movement.

According to a further feature two restraining elements are provided respectively to limit pointer movement in opposite directions and are separately adjustable to vary the limits of pointer movement in each direction.

The above and other objects and features of the invention will be more readily apparent from the following description when read in conjunction with the accompanying drawings, in which:

DESCRIPTION OF THE PREFERRED EMBODIMENTS

Figure 1:
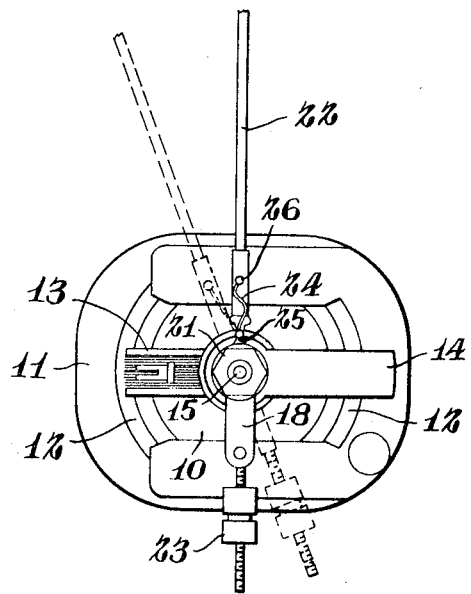
FIG. 1 is a top plan view of a meter movement showing the pointer in its centered position.
Figure 2:
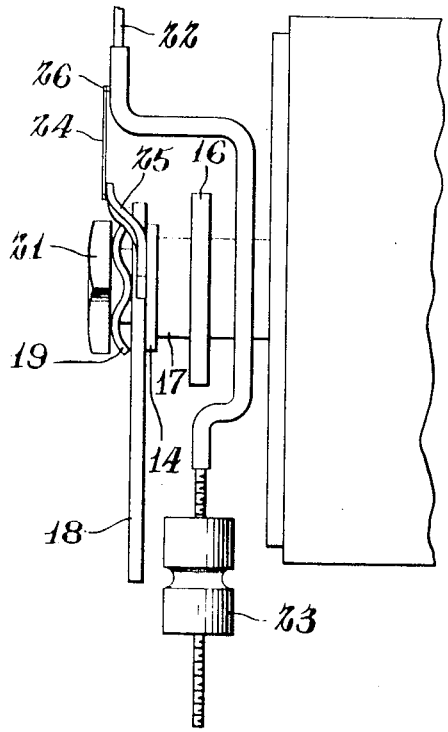
FIG. 2 is an enlarged partial side view.

Although the invention can be applied to any type of meter it is illustrated in FIG. 1 in connection with a core magnet meter having a center zero position. As shown, the meter comprises a core magnet 10 polarized horizontally, as seen in FIG. 1, and which is surrounded by a yoke 11 of magnetic material. The yoke is larger than the core magnet to leave air gaps 12 at the ends of the core magnet. A coil 13 is rotatably mounted on bridge pieces, one of which is shown at 14, for rotation about a central axis 15 and has legs extending through the air gaps 12 for movement therein. The coil may be connected in any desired manner to a source of electric current and will tend to deflect proportionately to the current flowing therethrough, as is understood in the art. Preferably the coil is urged toward its zero position by one or more springs, such as the flat coil spring 16 shown in FIG. 2. As shown, the spring 16 is anchored at its inner end to a hub 17 on which the coil and pointer are supported and at its opposite end to an adjustable arm 18 which is mounted on the bridge 14 for adjustable rotation about the axis 15. As best seen in FIG. 2 the arm 18 may be secured to the bridge by means of a spring washer 19 and an adjustable nut 21 which also supports a bearing in which the coil is rotatably mounted.

The coil carries a pointer 22 which may be secured to the hub member 17 and which is preferably counterbalanced by an adjustable weight 23 to avoid unnecessary strain on the bearings.

According to the present invention, movement of the pointer is limited by a flexible restraining element, indicated generally at 24, which is secured at one end to the pointer and at its opposite end to a fixed part adjacent to the pointer. The member 24 is flexible so that the pointer can move freely until the flexible member is stretched to a straightened condition at which it will stop further movement of the pointer. By determining the length of the member 24 and the placement of the connections thereof to the pointer and the fixed part, the limits of movement in one or both directions can easily be established. Also because there are no relatively moving parts which engage each other there is no possibility of sticking and interference with proper functioning of the instrument.

The flexible member 24 is in the form of a relatively thin strip having a width greater than its thickness so that it is much more flexible in one plane than in the other.

The strip is preferably made of a metal alloy such as a platinum base alloy varying in thickness from about 0.0002 inch to 0.0004 inch and in width from about 0.002 inch to 0.005 inch.

One end of the strip is secured as by soldering or welding to the end of an arm 25 which is carried by the bridge piece 14 and which extends partially around the pivotal axis of the pointer and coil. The other end of the strip is secured to the pointer at 26 as by soldering or otherwise securing it to the pointer or to a fastening member carried thereby. As shown the end of arm 25 to which the strip is secured is aligned with the pointer in its center or zero position to limit pointer movement in each direction to the same amount, although by positioning the end of arm 25 eccentrically a greater movement could be provided in one direction than in the other.

According to another feature of the invention the strip 24 is normally resiliently biased in a plane transverse to its width as seen in FIG. 1, so that it will assume a curved configuration except when it is extended to its maximum limit. Because of its greater thickness transverse to this plane the strip will tend to be self-supporting in that plane and will not sag materially even when it is relaxed so that there is no possibility of its engaging any adjacent parts and interfering with proper movement. At the same time, because the strip is extremely thin in a direction parallel to the plane it will have a very high degree of flexibility in the plane so that it will not interfere with free movement of the pointer and the coil.

Figure 3:
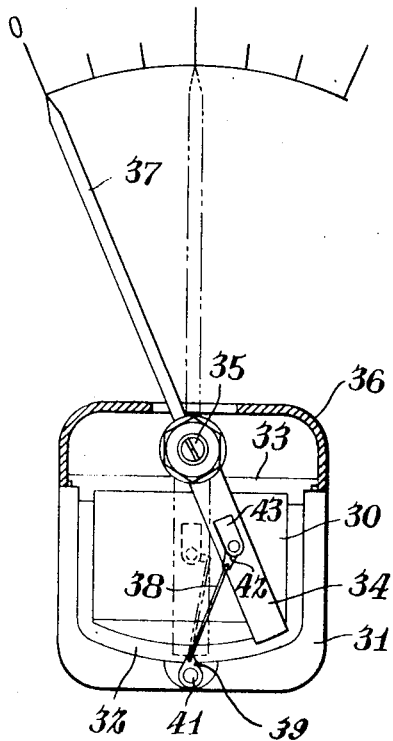
FIG. 3 is a view similar to FIG. 1 of an alternative construction.

The construction of FIG. 3 includes a magnet 30 mounted in a U-shaped yoke 31 and spaced therefrom at one end to leave an arcuate slot 32. The open end of the yoke is closed by a bar 33 of magnetic material. A coil 34 is pivoted at 35 on a bridge or cover member 36 in alignment with one of its legs and its other leg extends movably through the slot or gap 32. A pointer 37 is secured to the coil and is swingable from a zero position as shown to a position of maximum deflection.

To limit movement of the coil and pointer, an elongated restraining element 38 is provided which, in this construction, may be a flexible strip or a substantially rigid rod or wire. One end of the element is secured, as by soldering, to a fitting 39 which is secured to the yoke 31 adjacent to the slot 32. The fitting 39 is preferably adjustably connected to the yoke as by means of an eccentric pin 41 through which the position of the fitting and the effective length of the restraining element can be adjusted. The other end of the element is pivoted to a link 42 which is in turn pivoted to a bracket 43 on the pointer.

With the coil and pointer in the zero position illustrated, the element 38 and link 42 will be tensioned and will move into alignment to limit further movement counterclockwise. As the coil and pointer turn clockwise, the link 42 will swing out of alignment with the element 38 to permit free movement. Upon reaching the extreme clockwise position of the coil and pointer the link 42 will again align with the element 38 and will act in tension to prevent further movement.

Figure 4:
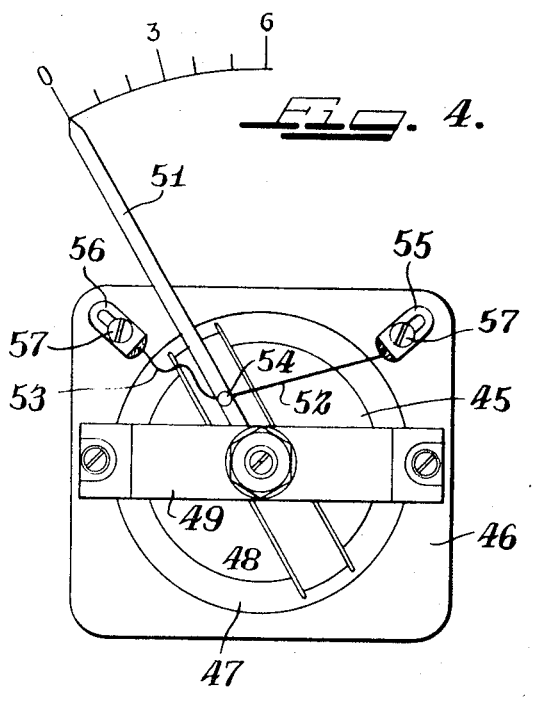
FIG. 4 is a view similar to FIGS. 1 and 3 of a further alternative construction.

FIG. 4 illustrates a further construction utilizing two restraining elements to limit movement of the coil and pointer in opposite directions respectively. By individually adjusting these elements the limit of movement in either direction can be adjusted without affecting the limit in the other direction.

As shown, a magnet 45 is mounted in a yoke 46 in spaced relation thereto to define an annular or partially annular gap 47. A coil 48 is pivoted on bridge pieces 49 and has its opposite legs extending through diametrically opposite portions of the gap 47. The coil carries a pointer 51 which is movable from a zero position as shown clockwise to a maximum deflected position.

Movement of the coil and pointer from the zero position is limited by a flexible restraining element 52 similar to the element 24 of FIG. 1 and movement in the opposite direction is limited by a similar flexible restraining element 53. The elements 52 and 53 are secured at one end to a common fastening 54 on the pointer and at their opposite ends are secured to mounting plates 55 and 56 respectively. Each of the mounting plates has an elongated slot therein receiving a fastening screw 57 by which it is adjustably secured to the yoke.

The restraining elements 52 and 53 extend on opposite sides of the pointer so that when one is tensioned to limit movement of the pointer in one direction the other is relaxed. Also due to their independent adjustability either limit of movement of the pointer can be adjusted without affecting the other.

With these constructions, it will be seen that the pointer is accurately stopped at limiting positions in one or both directions without the use of stop elements which engage each other and which could tend to stick together.

While several embodiments of the invention have been show and described herein, it will be understood that these are illustrative only and are not to be taken as a definition of the scope of the invention, reference being had for this purpose to the appended claims.

What is claimed is

1. In a meter movement having means for moving a pointer comprising a fixed assembly including a magnet and a magnetic yoke connected to the magnet and spaced therefrom to define gaps in which a coil can move and a movable assembly including a pivotally mounted coil having legs extending through said gaps and the pointer being connected to the coil to be moved thereby, the improvement which comprises in combination:

an elongated restraining element secured at one end to the movable assembly and at its other end to the fixed assembly limiting the movement of the movable assembly independently of said means for moving said pointer at a predetermined limit point, said restraining element being normally bent throughout the movement of said pointer and being tensioned at said predetermined limit point to limit further movement of said pointer at said limit point.

2. The meter movement of claim 1 wherein said elongated restraining element is flexible and the ends of the element are secured at spaced points so that the element will be relaxed when the movable assembly is in an intermediate position and will be tensioned to prevent further movement of the movable assembly when it is at one of the limits of its movement.

3. The meter movement of claim 2 wherein said elongated restraining element is a flexible strip of greater width than thickness and is mounted with its width parallel to the pivotal axis of the coil.

4. The meter movement of claim 1 wherein one of the ends of the restraining element is secured by connecting means having a part secured to one end of the element and pivoted to the adjacent assembly on an axis parallel to the pivotal axis of the coil.

5. The meter movement of claim 1 wherein said elongated restraining element is flexible and means is provided for securing said other end to the fixed assembly.

6. The meter movement of claim 5 including a pair of said elongated flexible restraining elements secured to the movable assembly at one end of each, and means securing the other ends of the elements to points on the fixed assembly to limit said movement of the movable assembly in opposite directions.

7. The meter movement of claim 5 in which said securing means comprises a plate secured to the other end of said element, said plate being formed with an elongated slot therein and a fastening extending through said slot and adjustably securing the plate to the fixed assembly.

8. The meter movement of claim 1 in which said elongated restraining element comprises a pair of rigid links pivotally mounted on said movable and fixed assemblies respectively, and a rigid element connecting said links together.

9. In a meter movement including a movable assembly having a pointer, fixed assembly, and means for moving the pointer, the improvement which comprises in combination:
an elongated restraining element, and means connecting the element at its ends to the fixed and movable assemblies limiting the movement of said pointer independently of the means for moving the pointer at a predetermined limit point, said restraining element being normally bent throughout the movement of said pointer and being tensioned at said predetermined limit point to limit further movement of said pointer at said limit point.

10. In a meter movement having means for moving a pointer comprising a fixed assembly including a magnet and a magnetic yoke connected to the magnet and spaced therefrom to define gaps in which a coil can move and a movable assembly including a pivotally mounted coil having legs extending through said gaps and the pointer being connected to the coil to be moved thereby, the improvement which comprises in combination:
an elongated restraining element secured at one end to the movable assembly and at its other end to the fixed assembly limiting the movement of the movable assembly independently of said means for moving said pointer at a predetermined limit point without impacting contact between said movable and fixed assemblies and without substantially influencing said movement except at said limit point.

11. The meter movement of claim 10 wherein said elongated restraining element is flexible and the ends of the element are secured at spaced points so that the element will be relaxed when the movable assembly is in an intermediate position and will be tensioned to prevent further movement of the movable assembly when it is at one of the limits of its movements.

12. The meter movement of claim 1 wherein said elongated restraining element is a flexible strip of greater width than thickness and is mounted with its width parallel to the pivotal axis of the coil.

13. The meter movement of claim 10 wherein one of the ends of the restraining element is secured by connecting means having a part secured to one end of the element and pivoted to the adjacent assembly on an axis parallel to the pivotal axis of the coil.

14. The meter movement of claim 10 wherein said elongated restraining element is flexible and means is provided for securing said other end to the fixed assembly.

15. The meter movement of claim 14 including a pair of said elongated flexible restraining elements secured to the movable assembly at one end of each, and means securing the other ends of the elements to points on the fixed assembly to limit said movement of the movable assembly in opposite directions.

16. The meter movement of claim 14 in which said securing means comprises a plate secured to the other end of said element, said plate being formed with an elongated slot therein and a fastening extending through said slot and adjustably securing the plate to the fixed assembly.

17. The meter movement of claim 10 in which said elongated restraining element comprises a pair of rigid links pivotally mounted on said movable and fixed assemblies respectively, and a rigid element connecting said links together.

18. In a meter movement including a movable assembly having a pointer, a fixed assembly, and means for moving the pointer, the improvement which comprises in combination:
an elongated restraining element, and means connecting the element at its ends to the fixed and movable assemblies limiting the movement of said pointer independently of the means for moving the pointer at a predetermined limit point without impacting contact between said pointer and said fixed assembly and without substantially influencing said movement except at said limit point.

* * * * *